(12) United States Patent
Furuhashi

(10) Patent No.: US 6,943,943 B1
(45) Date of Patent: Sep. 13, 2005

(54) ILLUMINATING APPARATUS FOR A MICROSCOPE

(75) Inventor: Hidehiko Furuhashi, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/042,694

(22) Filed: May 31, 1996

Related U.S. Application Data

(63) Continuation of application No. 08/259,060, filed on Jun. 13, 1994, now abandoned.

(30) Foreign Application Priority Data

Jun. 5, 1993 (JP) .............................................. 5-168716
Apr. 26, 1994 (JP) .............................................. 6-110253

(51) Int. Cl.⁷ ............................................. G02B 21/06
(52) U.S. Cl. ....................... 359/385; 359/388; 359/386; 359/387
(58) Field of Search ................................ 359/385, 386, 359/387–390, 723, 206, 100; 351/206

(56) References Cited

U.S. PATENT DOCUMENTS

| 2,152,513 A | * | 3/1939 | West | ........................... 359/386 |
| 2,207,411 A | * | 7/1940 | Pierce | ........................ 359/100 |
| 2,944,463 A | * | 7/1960 | Rantsch | ....................... 359/386 |
| 4,810,084 A | * | 3/1989 | Nyui | ........................... 351/206 |
| 4,852,985 A | * | 8/1989 | Fujihara et al. | ............. 359/387 |
| 4,906,081 A | * | 3/1990 | Yasuda | ....................... 359/723 |

FOREIGN PATENT DOCUMENTS

| DE | 3113843 | * | 1/1982 | ................. 359/385 |
| DE | 3810478 | * | 12/1988 | ................. 359/385 |
| DE | 3920043 | * | 1/1991 | ................. 359/385 |
| JP | 0040541 | * | 4/1978 | ................. 359/385 |

* cited by examiner

Primary Examiner—Mohammad Sikder

(57) ABSTRACT

An illuminating apparatus for a microscope comprises a condenser lens for condensing beams of illumination light from a light source and a pin-hole stop. The pin-hole stop has a pin-hole, provided on an optical axis, for transmitting only strong light beams from a central portion of the light source among the illumination light beams condensed by the condenser lens. The pin-hole stop also has a light reducing/illumination area, disposed around the pin-hole in symmetry with respect to the optical axis, for illuminating the periphery of an on-specimen portion illuminated with the light beams passing through the pin-hole with a quantity of light exhibiting a predetermined ratio to a quantity of the light passing through the pin-hole. The same apparatus also comprises an objective lens for converging the illumination light beams passing through this pin-hole stop on a specimen. The pin-hole stop is located in a position substantially conjugate to a pupil plane of the objective lens.

11 Claims, 7 Drawing Sheets

ILLUMINATING APPARATUS FOR A MICROSCOPE

This application is a continuation of application Ser. No. 08/259,060, filed Jun. 13, 1994, now abandoned.

BACKGROUND OF THE INVENTION

1. Field of the Invention

The present invention relates to an illuminating apparatus for a microscope.

2. Related Background Art

FIG. 7 is a view illustrating the construction of a conventional illuminating apparatus for a microscope.

Beams of light from a light source 101 are first condensed by a condenser lens 102. A cross-sectional area of the light is then narrowed down by an aperture stop 103. The light narrowed down by the aperture stop 103 passes through a relay lens 104 and thereafter travels through a field stop 105 and a field lens 106. The light is subsequently reflected by a half-mirror 107, whereby a real image 112 with respect to the light source 101 and the aperture stop 103 is formed in a rear-side focal position of the objective lens 108. A specimen 109 is irradiated with the light passing through the objective lens 108 at an angular aperture 2α corresponding to an aperture of the aperture stop 103.

When illuminating the specimen 109 with the light at such an angular aperture 2a that a numerical aperture of the objective lens 108 in use is maximized, a maximum resolving-power of the objective lens 108 is obtained, but contrast is lowered. Reversely, the resolving power decreases as the aperture stop 103 is stopped down, but the contrast is enhanced.

Then, it is generally considered that when the aperture stop 103 is stopped down to 70–80% of the numerical aperture of the objective lens 108, the resolving power does not drop down so much, and a well-contrasted illumination is obtained. In general, the objective lens 108 has a larger numerical aperture with a higher magnification. As a result, the angular aperture 2αincreases. When observing a specimen 109 (see FIG. 8) having a minute hole 109a like a contact hole through the high-powered objective lens 108 in, e.g., an LSI exhibiting a larger aspect ratio under such illumination conditions, the illumination is effected by opening the aperture stop 103. Then, as illustrated in FIG. 8, light beams 114b, 114c from the light source 101 correspond to an aperture of the aperture stop 103 and are positioned away from an optical axis L. The light beams 114b, 114c do not reach a bottom of hole 109a, with the result that a difference between an illuminance of the hole 109a and an illuminance of the surface of the specimen 109 becomes too large. The hole 109a is observed as nothing but a black point.

Then, the aperture stop 103 is stopped down; or alternatively, as illustrated in FIG. 9, a pin-hole stop 203 having a pin-hole 203a formed in a masking plate composed of a metal or the like is located at an optical-axis center L instead of the aperture stop 103. With this arrangement, it follows that the specimen 109 is illuminated with light passing through a small angular aperture. This results in a decreased difference between the illuminance of the bottom of the hole 109a and the illuminance of the surface of the specimen 109. The bottom of the hole 109a can be therefore observed.

When illuminating the specimen 109 with light passing through the small angular aperture as shown in FIG. 9, however, the bottom of the hole 109 is observable. But, the following problems arise. The resolving power of the objective lens 108 is deteriorated due to an over stop-down. Besides, an observed only an image exhibits a glare, wherein the contrast is over enhanced.

SUMMARY OF THE INVENTION

It is a first object of the present invention, which has been devised under such circumstances, to provide an illuminating apparatus for a microscope that is capable of observing a bottom surface of a hole in the surface of a specimen without deteriorating a resolving power of the microscope.

According to a first aspect of the present invention, there is provided an illuminating apparatus for a microscope, comprising a condenser lens for condensing beams of illumination light from a light source, a pinhole stop for limiting the illumination light beams from this condenser lens and an objective lens for converging the illumination light beams limited by this pin-hole stop on a specimen, the above pin-hole stop being located in a position substantially conjugate to a pupil plane of the objective lens. In this illuminating apparatus, the pinhole stop has a pin-hole disposed substantially on an optical axis of the illumination light. The pin-hole stop also has a light reducing area, so disposed as to be contiguous to a boundary of the pin-hole and encircle thereabout, for transmitting a part of the incident illumination light beams by limiting the illumination light beams.

According to a second aspect of the present invention, there is provided an illuminating apparatus for a microscope, wherein the pin-hole stop has two pieces of polarizing plates, the pin-hole is formed in at least one of the polarizing plates, and these polarizing plates are so located as to be relatively rotatable about the optical axis.

According to a third aspect of the present invention, there is provided an illuminating apparatus for a microscope, comprising a condenser lens for condensing beams of illumination light from a light source, a pinhole stop for limiting the illumination light beams from this condenser lens and an objective lens for converging the illumination light beams limited by this pin-hole stop on a specimen, the pin-hole stop being located in a position substantially conjugate to the pupil plane of the objective lens. In this illuminating apparatus, the pin-hole stop has a pin-hole disposed substantially on the optical axis of the illumination light. The pin-hole stop also has a masking area, so disposed as to be contiguous to a boundary of the pin-hole but to encircle this pin-hole, for shielding the incident illumination light. The pin-hole stop further has a transmissive area, contiguous to a boundary of the masking area, for transmitting at least a part of the illumination light beams.

According to a fourth aspect of the present invention, there is provided an illuminating apparatus for a microscope, in which the transmissive area is disposed to encircle the masking area and which is composed of an annular opening.

According to a fifth aspect of the present invention, there is provided an illuminating apparatus for a microscope, in which an aperture stop for limiting the illumination light beams passing through the light reducing area is located in the vicinity of the pin-hole stop.

According to a sixth aspect of the present invention, there is provided an illuminating apparatus for a microscope, comprising a condenser lens for condensing beams of illumination light from a light source, an aperture stop for limiting the illumination light beams from this condenser lens and an objective lens for converging the illumination light beams narrowed down by this aperture stop on a specimen, the aperture stop being located in a position substantially conjugate to the pupil plane of the objective lens. This illuminating apparatus further comprises a relay lens for converging the illumination light beams limited by the aperture stop and a pin-hole stop disposed on a conjugate plane of the aperture stop with respect to this relay lens. The pinhole stop has a pin-hole disposed substantially on the optical axis of the illumination light. The pin-hole stop also has a light reducing area, so disposed as to be contiguous to a boundary of this pin-hole and encircle thereabout, for transmitting a part of the incident illumination light beams by limiting the illumination light.

An illumination apparatus for a microscope according to the present invention has a central aperture, located in a position substantially conjugate to a pupil plane of an objective lens, for transmitting only the light beams from an area in the vicinity of the optical axis. The specimen is therefore irradiated with light having a small angular aperture. The bottom of the hole in a specimen surface can thereby be observed. Further, the peripheral light reducing area for transmitting a part of the light beams which do not pass through the central aperture is located around the central aperture. It is therefore possible to irradiate the specimen with light exhibiting a large angular aperture. It is also possible to reduce over-contrast without reducing the resolving power of the objective lens.

Further, the pin-hole stop involves the use of the two polarizing plates. At least one of the polarizing plates is formed with the pin-hole located at the center of the optical axis, with any one of the polarizing plates is rotatable about the optical axis. With this arrangement, it is feasible to arbitrarily adjust the ratio of the quantity of the light from the pin-hole to the quantity of the light from the area exclusive of the pin-hole. It is therefore possible to observe holes, taking a variety of shapes, of the specimen in the state where the resolving power is high.

Moreover, when using the aperture stop in combination with the pin-hole stop, the light beams from the light reducing area can be properly narrowed down, and, therefore, it is possible to correspond to the changes in terms of, for example, the objective lens, the surface configuration and the reflectivity of the specimen. A high-contrast image as a whole can therefore be obtained.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be discussed with reference to the drawings.

Figure 1:
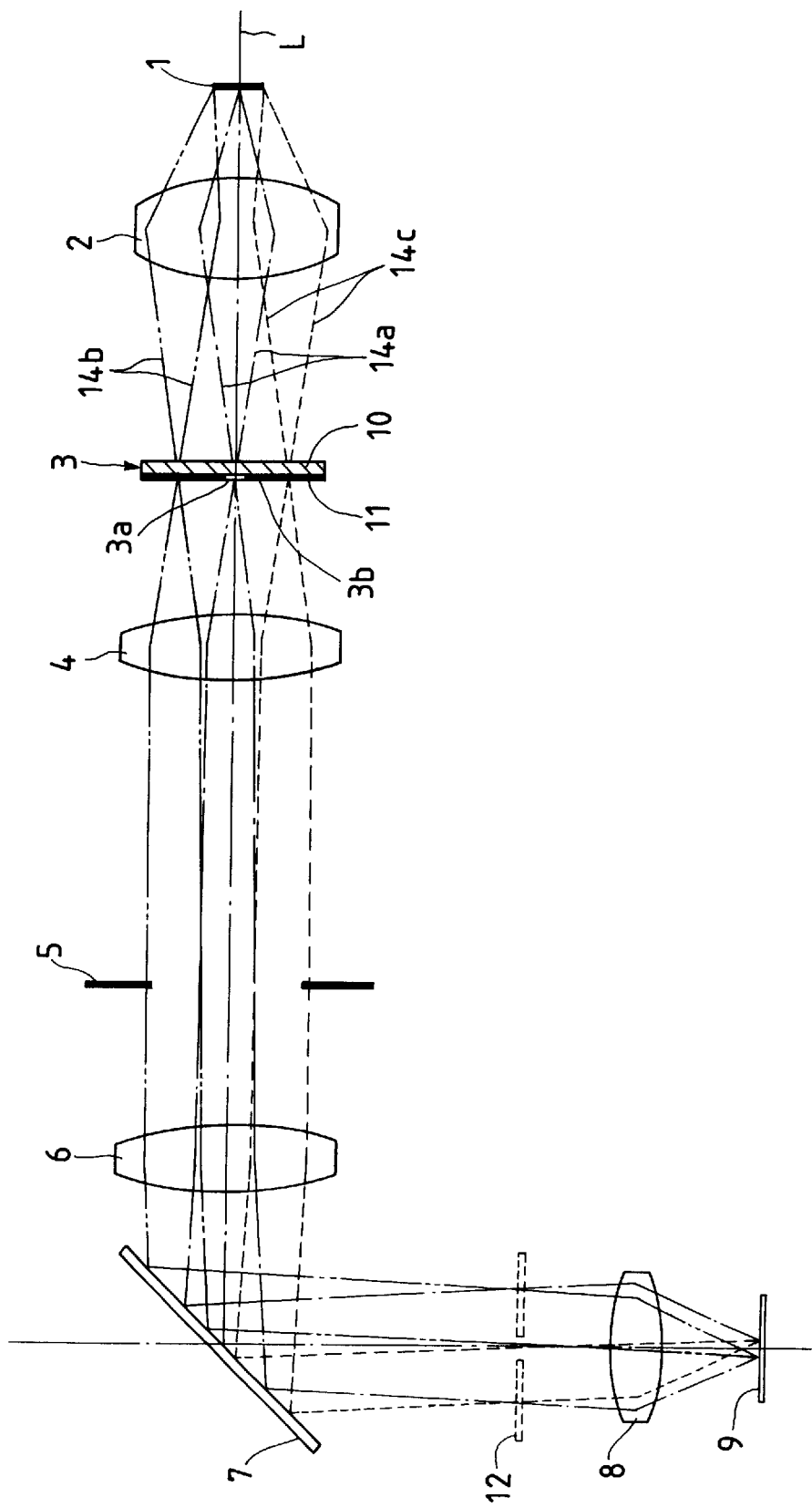
FIG. 1 is a view illustrating a whole construction of an illuminating apparatus for a microscope in a first embodiment of this invention.

FIG. 1 is a view illustrating a whole construction of an illuminating apparatus for a microscope in a first embodiment of this invention. A condenser lens 2 for condensing beams of illumination light is disposed in front of a light source 1. A pin-hole stop 3 is located in front of the condenser lens 2. A relay lens 4, a field stop 5 and a field lens 6 are located in front of the pinhole stop 3. Located in front of the field lens 6 is a half-mirror 7 for deflecting the illumination light at a right angle, which emerges from the field lens 6. The illumination light reflected from the half-mirror 7 falls on the specimen 9 via the objective lens 8, thus performing a so-called Köhler-illumination. An unillustrated eyepiece is located in the rear of the objective lens 8.

The above pin-hole stop 3 is disposed in a position substantially conjugate to the pupil plane of the objective lens 8. The pin-hole stop 3 has a pin-hole 3a located at an optical-axis center L and forming a central aperture.

Figure 2A:
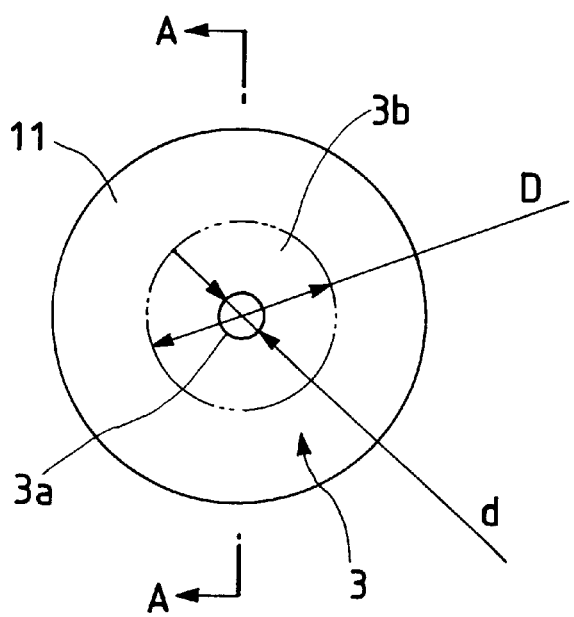
FIGS. 2A and 2B are views showing a pin-hole stop of the microscope illuminating apparatus of FIG. 1.
Figure 2B:
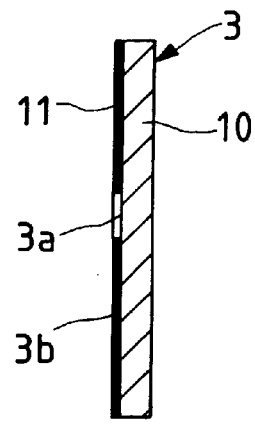

FIGS. 2A and 2B illustrate the pin-hole stop of the microscope illuminating apparatus in the first embodiment of this invention. FIG. 2A is a front view. FIG. 2B is a sectional view taken along the line A—A of FIG. 2A.

The pin-hole stop 3 in this embodiment includes a light reducing film 11 deposited on one-side surface of a glass filter 10 elusively of a diametric portion d of the central part of the transparent glass filter 10. A light reducing area 3b is an area deposited with the light reducing film 11 but encircled by a circle having a diameter D. The pin-hole 3a is a circular area, having the diameter d, on which no light reducing film 11 is deposited. The diameter D corresponds to a diameter of the pupil of the objective lens 8. The pin-hole stop 3 also has an area deposited with the light reducing film 11 outwardly of the light reducing area 3b having the diameter D. When incorporated into the illuminating apparatus, however, the pin-hole stop 3 is constructed so that the illumination light is not incident on the external area of the light reducing area 3b. A brightness of the illumination light from the pin-hole 3a and a brightness of the illumination light from the light reducing area 3b are respectively proportional to a square of the diameter. A ratio of a quantity of the illumination light from the pin-hole 3a to a quantity of the illumination light from the light reducing area 3b becomes approximately $d^2/D^2$. In accordance with this embodiment, the quantity of the illumination light from the pin-hole 3a of the pin-hole stop 3 is substantially equal to that of the illumination light from the light reducing area 3b, and, therefore, the light reducing area 3b is set to a transmittance of $d^2/D^2$.

Beams of light emerging from a light source 1 are condensed by a condenser lens 2 and limited by the pin-hole stop 3. The light beams limited by the pin-hole stop 3 travel through a field stop 5 and a field lens 6 after passing through a relay lens 4. The light beams are then reflected by a half-mirror 7, with the result that a real image 12 with respect to the light source 1 and the pinhole stop 3 is formed in a rear-side focal position of the objective lens 8. The light beams passing through the objective lens 8 fall on a specimen 9. The pin-hole 3a of the pin-hole stop 3 transmits a strong light beam 14a from the center of the light source 1.

Weak light beams 14b, 14c emerging from portions of the light source 1 which are spaced away from an optical axis L are attenuated or reduced by the light reducing area 3b, penetrate therethrough, and fall on the specimen 9.

The light beams reflected from the specimen 9 are converged through the objective lens 8, penetrate the half-mirror 7 and reach an unillustrated eyepiece.

In accordance with this embodiment, the pin-hole 3a of the pin-hole stop 3 is located on the optical axis L. The transmittance of the light reducing area 3b is set to obtain the illumination light quantity substantially equal to the quantity of the illumination quantity from the pin-hole 3a. It is therefore possible to reduce an excessive contrast exhibiting a glare due to an over stop-down. It is also feasible to observe an interior of a hole such as a contact hole 9a formed in the surface of the specimen 9 in a state where the resolving power is high.

Note that a ring-like masking film having a minor diameter d and a major diameter d1 (<D) may be deposited along the periphery of the pin-hole 3a, and a light reducing film may also be deposited along the periphery thereof.

Figure 3A:
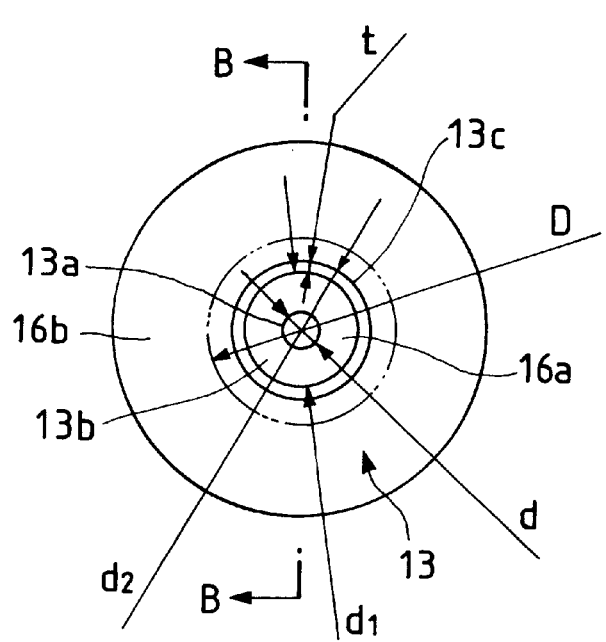
FIGS. 3A and 3B are views illustrating a pin-hole stop of the microscope illuminating apparatus in a second embodiment of this invention.
Figure 3B:
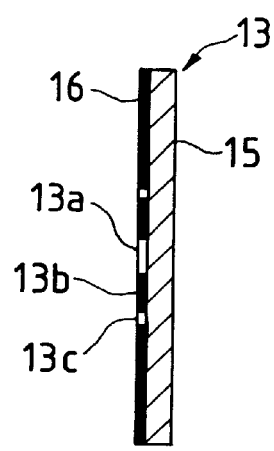

FIGS. 3A and 3B illustrate a pin-hole stop of the microscope illuminating apparatus in accordance with a second embodiment of the present invention. FIG. 3A is a front view. FIG. 3B is a sectional view taken along the line B—B of FIG. 3A. An explanation of the elements common to the first embodiment will be omitted.

A pin-hole stop 13 in this embodiment includes a ring-like masking film 16a having a minor diameter d and a major diameter d1 and so deposited on one-side surface of a transparent glass filter 15 as to be concentric with the glass filter 15. Masking film 16a forms light reducing area 3b. A ring-like masking film 16b having a minor diameter d2 (>d1) is further deposited along the periphery of the masking film 16a. The pin-hole 13a is formed inwardly of the masking film 16a. An annular transmissive area 13c having a width t is formed between the masking film 16a and the masking film 16b. A diameter D in FIG. 3A corresponds to a diameter of the pupil of the objective lens 8. The annular transmissive area 13c is formed in a position spaced by 70–80% away from the center of the diameter D.

A ratio of a quantity of the light from the pin-hole 13a to a quantity of the light from the annular transmissive area 13c is given by $d_2/4t(d_2+t)$, where $d_2$ of FIG. 3A is the major diameter of the annular transmissive area 13c. In this embodiment, the quantity of the light is substantially equalized to the quantity of the light from the annular transmissive area 13c, and hence the dimensions are set to establish the formula:

$$d_2 = 4t(d_2+t).$$

The microscope illuminating apparatus in the second embodiment is capable of obtaining the same effects as those of the microscope illuminating apparatus in the first embodiment discussed above.

Incidentally, an example of modification of the second embodiment will be given as below. Instead of the single annular transmissive area 13c, a plurality of spot-like transmissive subareas smaller than the pin-hole 13a may be disposed around the pin-hole 13a. Alternatively, a plurality of linear transmissive subareas may also be disposed radially about the pin-hole 13a.

Further, another example of modification of the second embodiment will be explained. In place of the pin-hole stop 13 in the second embodiment, which is constructed by depositing the masking films 16a, 16b on the glass disk 15, the following arrangement may be adopted. A pin-hole is formed in the central portion of a metal disk. A plurality of circular-arc slits concentric with the pin-hole may be disposed at a fixed interval along the periphery of the pin-hole.

The quantity of the light from the pin-hole is set substantially equal to that of the light from the peripheral area in the first and second embodiments. It is, however, preferable to determine a size of the pinhole of the pin-hole stop and a quantity of the marginal light so as to select a ratio-of-light-quantity in accordance with conditions as adapted to a magnification and a numerical aperture of the objective lens, a size of a specimen hole like a contact hole and a reflectivity of the specimen.

Note that the pin-hole stop of FIG. 3 is formed with the single piece of ring-like aperture but may be provided with a plurality of rings. Further, the aperture assumes a configuration as an aggregation of a plurality of extremely small holes or takes other shapes such as a plurality of radiant lines (in this case, this requires a symmetry with respect to the optical axis. For instance, no right-and-left deviation should be produced). Besides, the transmissive area may be formed with a light reducing filter for attenuating or reducing the light.

Figure 4A:
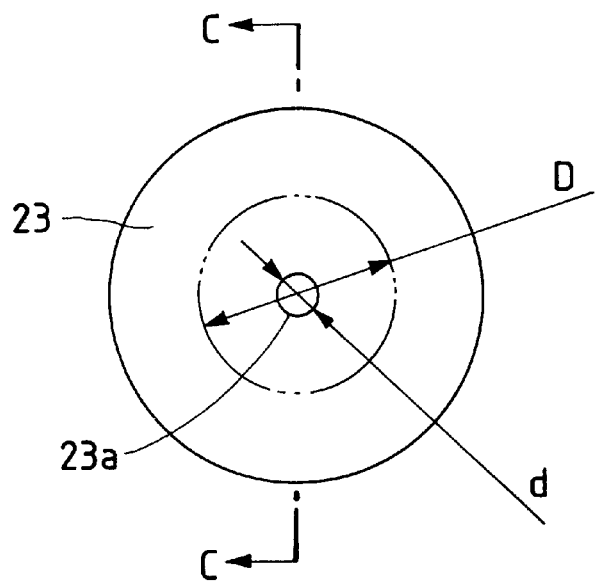
FIGS. 4A and 4B are views illustrating a pin-hole stop of the microscope illuminating apparatus in a third embodiment of this invention.
Figure 4B:
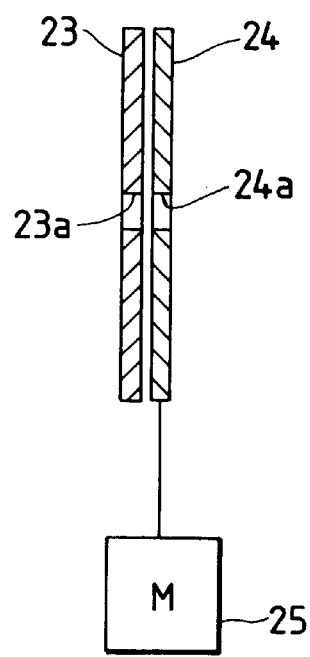

FIGS. 4A and 4B show a pin-hole stop of the microscope illuminating apparatus in a third embodiment of this invention. FIG. 4A is a front view. FIG. 4B is a sectional view taken along the line C—C of FIG. 4A.

An explanation of the elements common to those in the first embodiment will be omitted.

In accordance with this third embodiment, two polarizing plates 23, 24 are provided as a pin-hole stop. The polarizing plates 23, 24 are formed with pin-holes 23a, 24a, respectively. The polarizing plate 24 is rotatable about the optical axis by a driving motor 25. Note that the polarizing plate may be manually rotated.

When the polarizing plate 24 is rotated about the optical axis, it arbitrarily adjusts a ratio of a quantity of light from the pin-holes 23a, 24a to a quantity of light from areas encircled by circles each having a diameter D elusively of the pin-holes 23a, 24a. Hence, it is possible to substantially equalize the quantity of the light from the pin-holes 23a, 24a to the quantity of the light from the areas encircled by the circles having the diameter D elusively of the pin-holes 23a, 24a by rotating the polarizing plate 24. The same effects as those in the first embodiment can be obtained.

Note that this embodiment has dealt with the case where both of the polarizing plates 23, 24 are provided with the pin-holes, but, if reductions in the quantities of the light from the pin-holes are ignorable, the pinhole may be formed in any one of the polarizing plates.

The first and third-embodiments discussed above do not present such a type that the light from the areas peripheral to the pin-holes is not completely intercepted. Hence, the whole image on the side of the light source can be observed. It is easy to perform positioning of the light source so as to superpose the image of the light source on the optical axis of the objective lens.

Note that the pin-holes and the masking films may be formed in the vicinity of the center, and only the peripheral area may be formed with a polarizing filter.

Figure 5:
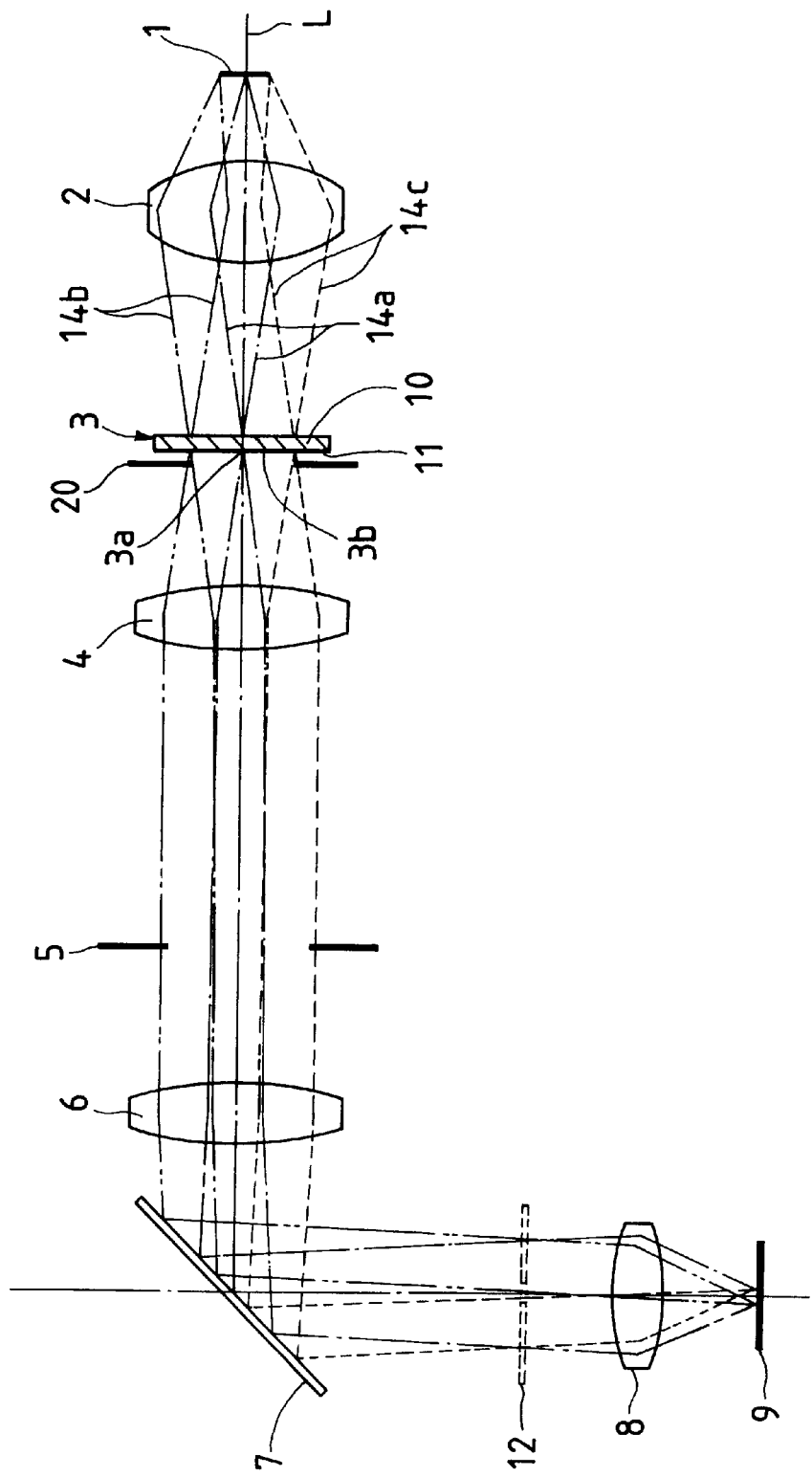
FIG. 5 is a view illustrating a whole construction of the microscope illuminating apparatus in a fourth embodiment of this invention.

FIG. 5 is a view illustrating a whole construction of the microscope illuminating apparatus in accordance with a fourth embodiment of the present invention.

The elements common to those in the first embodiment are marked with the same symbols, and their explanation will be omitted.

This fourth embodiment corresponds to an example of modification of the first embodiment shown in FIG. 1. A difference from the first embodiment is that an aperture stop 20 for narrowing down the light from the pin-hole 3 is, as illustrated in FIG. 5, located in close proximity to the pin-hole stop 3.

According to this fourth embodiment, the same effects as those in the first embodiment are obtainable. At the same time, the light reducing area 3b of the pin-hole stop 3 is stopped down to 70–80% of the numerical aperture of the objective lens 8 by use of the aperture stop 20 other than the pin-hole stop 3. Accordingly, even if the objective lens is replaced with a different objective lens, or even if the surface configuration of the specimen 9 or the reflectivity changes, the image exhibiting a high contrast as a whole can be obtained.

Figure 6:
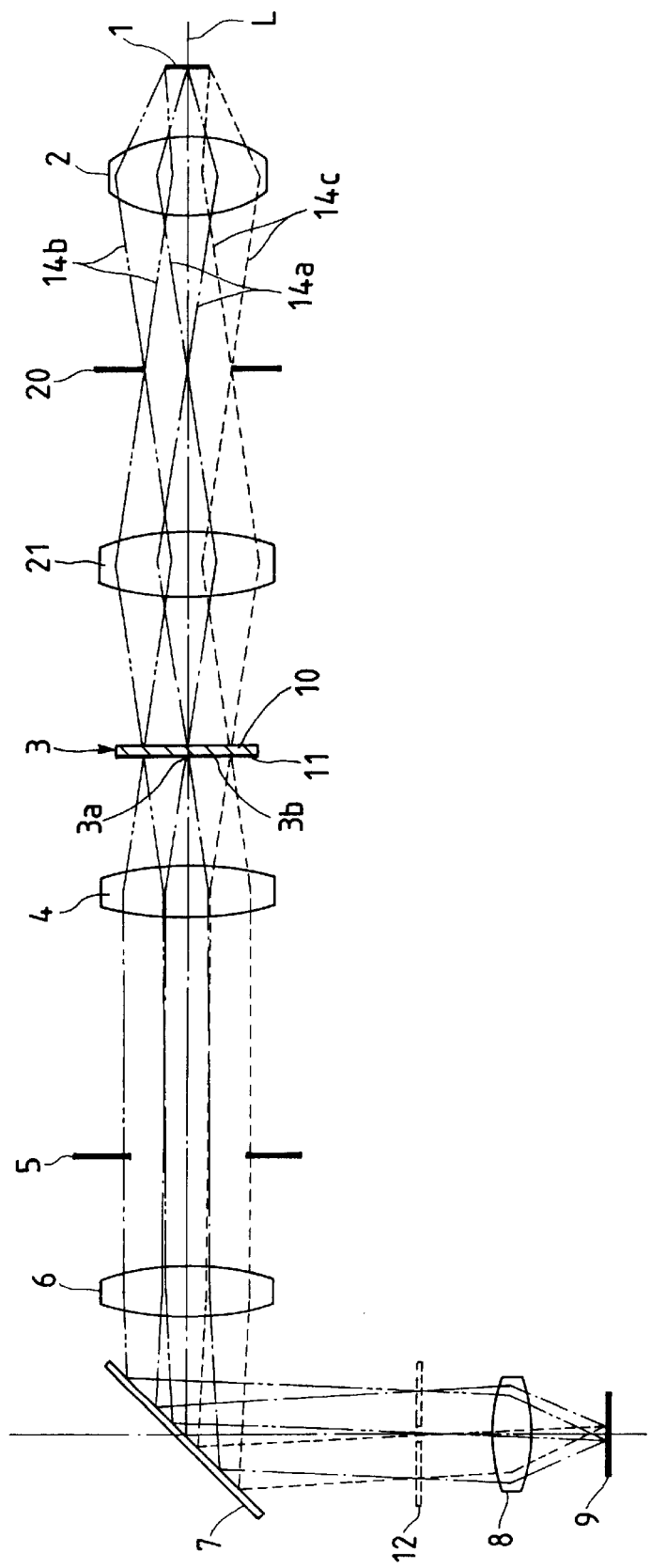
FIG. 6 is a view illustrating a whole construction of the microscope illuminating apparatus in a fifth embodiment of this invention.
Figure 7:
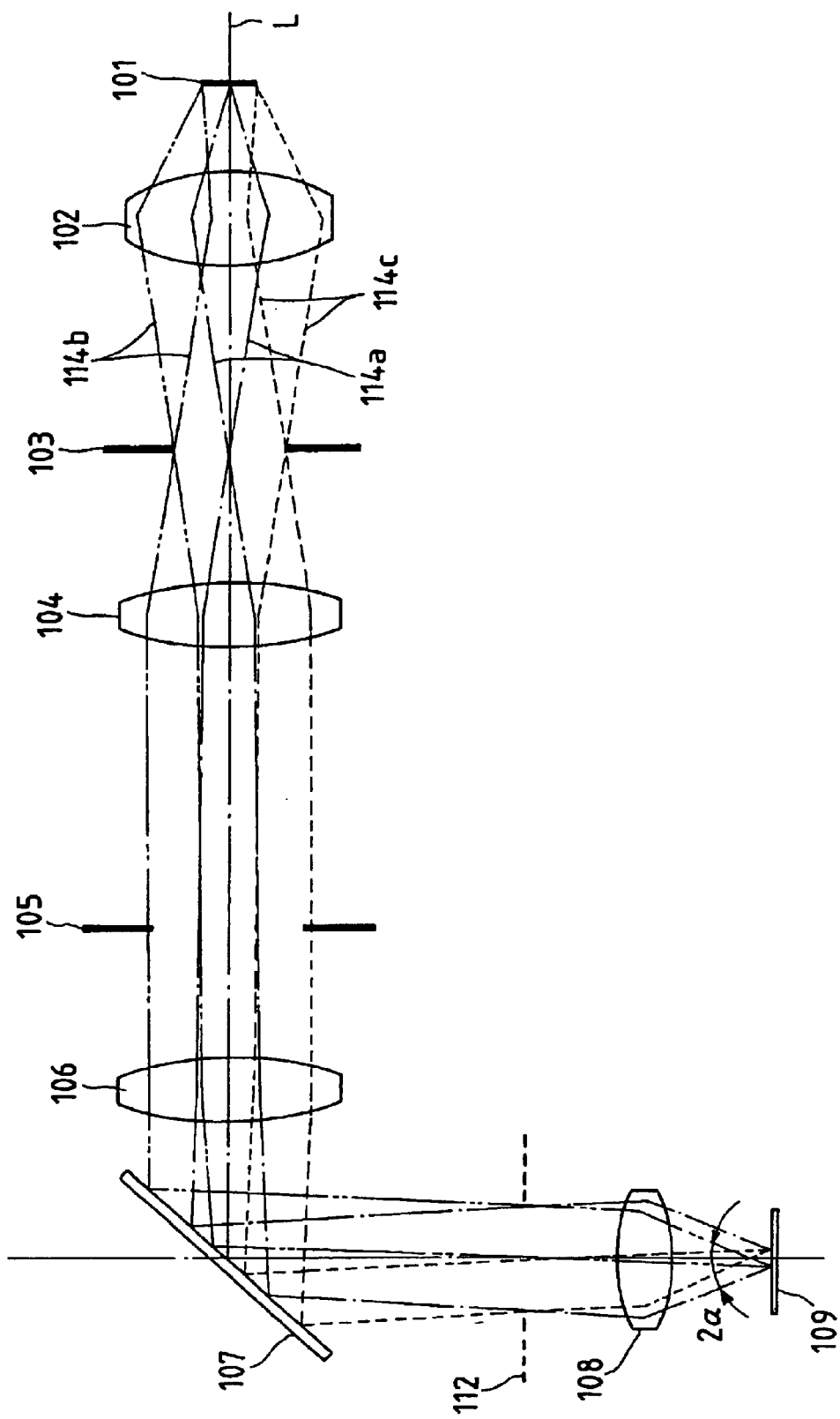
FIG. 7 is a view illustrating a whole construction of a conventional illuminating apparatus for a microscope.
Figure 8:
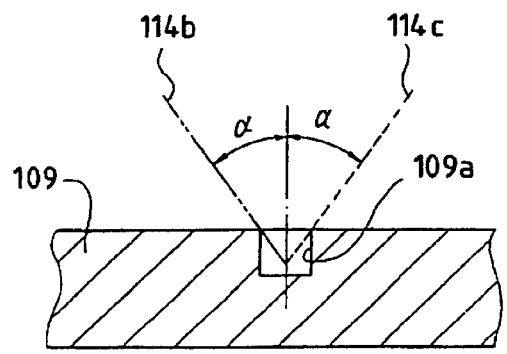
FIG. 8 is a sectional view of a specimen.
Figure 9:
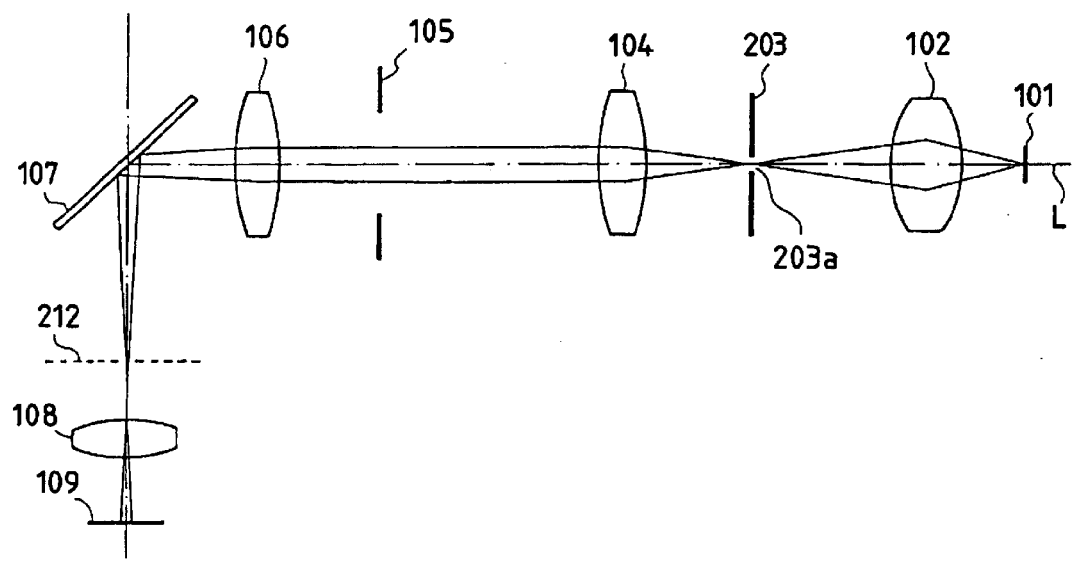
FIG. 9 is a view illustrating a whole construction of another conventional microscope illuminating apparatus.

FIG. 6 is a view illustrating a whole construction of the microscope illuminating apparatus relative to an example of modification of the fourth embodiment. The elements common to those in the fourth embodiment are marked with the same symbols, and their explanation will be omitted.

This example of modification has a difference from the fourth embodiment in terms of such an arrangement that the aperture stop 20 and the pin-hole stop 3 are, as shown in FIG. 6, disposed in front-and-rear conjugate positions, spaced away from each other, of a relay lens 21.

In this example of modification, the aperture stop 20 is located in front of the condenser lens 2. The relay lens 21 for re-converging the light limited by the aperture stop 20 is located in front of the aperture stop 20. The pin-hole stop 3 is disposed in a position conjugate to the aperture stop 20 behind the relay lens 21. The aperture stop 20 and the pin-hole stop 3 are located in the positions conjugate to the pupil plane of the objective lens 8. The specimen 9 is irradiated with the light from the pin-hole stop 3 via the relay lens 4, etc.

According to this example of modification, it is possible to obtain the same effects (the image is observable with a proper numerical aperture in accordance with changes in terms of the objective lens, the surface configuration and the reflectivity of the specimen) as those in the fourth embodiment.

As discussed above, the microscope illuminating apparatus according to the present invention is capable of obviating the glaring over-contrast derived from the over stop-down. The interior of the specimen surface hole such as the contact hole can be observed in the state where the resolving power is high.

Further, the illuminating apparatus employs the two polarizing plates, and at least one polarizing plate is formed with the pin-hole disposed at the center of the optical axis. Besides, any one of the polarizing plates is so constructed as to be rotatable about the optical axis. It is thereby possible to arbitrarily adjust the ratio of the quantity of the light from the pin-hole to the quantity of the light from the area exclusive of the pin-hole. This makes it feasible to observe holes, assuming a variety of shapes, of the specimen in the high-resolving-power state.

Moreover, there is not presented such a type that the light from an area peripheral to the pin-hole is not completely cut off. Hence, the whole image on the side of the light source can be observed. It is easy to effect positioning of the light source to superpose the image of the light source on the optical axis of the objective lens.

Additionally, when the aperture stop is employed in combination with the pin-hole stop, the light beams from the light reducing area can be properly narrowed down. It is therefore possible to correspond to the changes in terms of, e.g., the objective lens, the surface configuration and the reflectivity of the specimen. The high-contrast image as a whole can be obtained.

It is apparent that, in this invention, a wide range of different working modes can be formed based on the invention without deviating from the spirit and scope of the invention. This invention is not restricted by its specific working modes except being limited by the appended claims.

What is claimed is:

1. An illuminating apparatus for a microscope, comprising:
    a light source outputting beams of illumination light;
    an objective lens converging the beams of illumination light output from said light source on a specimen;
    a stop located in a plane substantially conjugate to a pupil of the objective lens and disposed between said light source and said objective lens for reducing the beams of illumination light upon transmission therethrough, said stop having
    (a) a central aperture, provided on an optical axis of the illumination optical system and having a diameter smaller than a diameter of an image of said pupil projected on said plane; and
    (b) a peripheral light reducing area having a diameter equal to or larger than the diameter of the image of said pupil projected on said plane, for transmitting a part of the light beams which impinges about a periphery of said central aperture.

2. The illuminating apparatus for the microscope according to claim 1, wherein said central aperture is composed of a pin-hole.

3. The illuminating apparatus for the microscope according to claim 1, wherein said peripheral light reducing area has a light reducing filter.

4. The illuminating apparatus for the microscope according to claim 1, wherein said peripheral light reducing area is disposed in symmetry with respect to the optical axis.

5. The illuminating apparatus for the microscope according to claim 1, wherein said peripheral light reducing area has a first ring-like masking area disposed along the periphery of said central aperture, a ring-like transmissive area disposed along the periphery of said first masking area and a second masking area disposed along the periphery of said transmissive area.

6. The illuminating apparatus for the microscope according to claim 1, wherein said stop has two polarizing plates located in a side-by-side relationship but set substantially perpendicular to the optical axis and further rotatable relative to each other about the optical axis.

7. The illuminating apparatus for the microscope according to claim 1, wherein an aperture stop for limiting the illumination light beams passing through said peripheral light reducing area is provided in a position vicinal to said stop on a side of said objective lens.

8. The illuminating apparatus for the microscope according to claim 1, further comprising:
    condenser lens condensing and transmitting said beams of illumination light output from said light source:
    an aperture stop limiting the illumination light beams transmitted from said condenser lens; and
    a relay lens converging the illumination light beams passing through said aperture stop, said aperture stop and said relay lens being located between said condenser lens and said stop,
    wherein said stop is located in a position conjugate to said aperture stop with respect to said relay lens and limits the illumination light beams converged by said relay lens.

9. The illuminating apparatus for a microscope according to claim 1, further comprising:

an adjuster for changing a ratio of a quantity of the light passing through said central aperture and a quantity of the light passing through said peripheral light reducing area.

10. The illuminating apparatus for the microscope according to claim 1, wherein a quantity of light passing through said central aperture and a quantity of light passing through said peripheral light reducing area are adjusted to a predetermined ratio.

11. An illuminating apparatus for a microscope, comprising:

a light source outputting beams of light;

an objective lens converging the light beams output from the light source about an optical axis; and an optical filter disposed along the optical axis between the light source and the objective lens, and transmitting the beams of light therethrough, said optical filter deposited with a partially transparent film normal to the optical axis and having a first diameter, wherein said optical filter is not deposited with a partially transport film about a central aperture, said central aperture having a second diameter less than the first diameter and smaller than a diameter of an image of a pupil of said objective lens projected thereon.

\* \* \* \* \*